3,162,626
PROCESS FOR THE PREPARATION OF HIGH MOLECULAR WEIGHT POLYVINYL ALCOHOLS
Jürgen Smidt and Alex Sabel, Munich, Germany, assignors to Consortium für Elektrochemische Industrie G.m.b.H., Munich, Germany, a corporation of Germany
No Drawing. Filed Nov. 7, 1961, Ser. No. 150,638
Claims priority, application Germany Nov. 21, 1960
5 Claims. (Cl. 260—91.3)

This invention relates to a novel process for the production of high molecular weight polyvinyl alcohols whose aqueous solutions exhibit a high viscosity at low concentrations.

High molecular weight polyvinyl alcohols whose aqueous solution exhibit a high viscosity at low concentrations are desirable for many purposes, for instance as thickening agents. Aside from an after-treatment of conventional polyvinyl alcohols, which, while increasing the molecular weight, always leads, in addition, to undesirable changes in properties, the technical preparation of such high molecular weight polyvinyl alcohols is effected by means of hydrolysis of polyvinyl acetates which were prepared in a particular manner. However, the previously known processes of preparing polyvinyl acetates for polyvinyl alcohol production all have the disadvantage that the special preparation of the polyvinyl acetates intended for saponification is more complicated than the usual polymerization processes. In one method for instance, using special catalysts, the reaction is interrupted when a polymerization completion of 50 to 75% is reached. Thereafter the residual monomer must subsequently be removed. In another method, copolymerization components are employed, so that after saponification polymer products are obtained which are no longer polyvinyl alcohols in the strict sense.

It is an object of the present invention to develop a process of producing high molecular weight polyvinyl alcohols having a viscosity of more than 120 centipoises in a 4% aqueous solution at 20° C.

It is another object of the present invention to develop a process of producing a polyvinyl acetate by polymerization of vinyl acetate in the presence of a bromate ion/bisulfite ion redox catalyst, which polyvinyl acetate upon saponification produces a high molecular weight polyvinyl alcohol having a viscosity of more than 120 centipoises in a 4% aqueous solution at 20° C.

These and other objects of the invention will become more apparent as the description thereof proceeds.

Surprisingly, it has now been found that the polymerization process with a bromate ion/bisulfite ion redox catalyst, which has heretofore not been employed for the technical preparation of polyvinyl acetate from vinyl acetate, yields polymers which, upon complete or partial saponification, produce high molecular weight polyvinyl alcohols.

In accordance with the present invention, particularly high molecular weight polyvinyl alcohols which have a viscosity of more than 120 centipoises in a 4% aqueous solution at 20° C. are obtained by saponifying those polyvinyl acetates which are obtained by polymerization of vinyl acetate with bromate ion/bisulfite ion redox catalysts.

The vinyl acetate polymerization, which may be effected by suspension or emulsion of the monomer in water, is performed under normal temperature conditions of between 20 and 120° C., preferably at 60 to 90° C. The bromate ion/bisulfite ion redox catalyst system is employed in the form of their water-soluble salts, preferably in the form of their alkali metal salts. The required bromate ion concentration is very low and lies between 0.01 and $2.0 \times 10^{-3}$ mols per mol of vinyl acetate, whereas from 0.05 to $5.0 \times 10^{-3}$ mols of bisulfite ion per mol of vinyl acetate are required. In general, the polymerization is terminated, with practically complete reaction, within as little as 2 to 3 hours.

In practice, the procedure is advantageously that water, vinyl acetate monomer, bisulfite and emulsifier or suspension stabilizer are placed into the reaction vessel and an aqueous bromate solution is then allowed to flow into the vessel at the reaction temperature, accompanied by stirring. The reaction temperature can be maintained by a proper rate of addition of the bromate solution.

The polyvinyl acetate is recovered from the polymerization mixture by customary methods such as filtration, precipitation etc. Saponification of the polyvinyl acetate is carried out by customary methods under alkaline or acid conditions. Preferably, the polyvinyl acetate is dissolved or suspended in a lower alkanol such as methanol and heated to reflux in the presence of either a basic esterification catalyst such as an alkali metal lower alkanolate, preferably sodium methylate, or an acidic esterification catalyst such as a strong mineral acid, preferably perchloric acid.

After saponification, polyvinyl alcohols with viscosities above 120 centipoises when measured at 20° C. in a 4% aqueous solution are obtained. The good solubility of the polyvinyl acetate polymerizates of the invention makes itself advantageously noticeable in the preparation of the polyvinyl alcohols by ester exchange in organic solvents, so that the difficulty of the dissolution of the high molecular weight polyvinyl acetate is eliminated. Upon approximately complete saponification, the corresponding polyvinyl alcohols also exhibit good solubility properties and are soluble in cold water.

The following examples are illustrative of the invention. They are not, however, to be construed as limiting the invention. Obviously, expedients known to those skilled in the art may be substituted for the specific embodiments hereinafter disclosed.

EXAMPLE I

*Preparation of Polyvinyl Acetate*

500 gm. of vinyl acetate and 600 gm. of water, which had dissolved therein 0.3 gm. of carboxyethyl cellulose (sold under the trademark "Cellosize WP 300") as a suspension stabilizer and also 0.8 gm. of sodium bisulfite, were thoroughly admixed by stirring and the mixture was then heated to 60° C. After the mixture reached the reaction temperature, a 0.2% aqueous potassium bromate solution was slowly added dropwise, accompanied by continuous stirring. Because of the immediate onset of polymerization, the temperature rose to 65° C., accompanied by the occurrence of reflux. By controlling the rate of addition of the bromate solution, the temperature or the reflux was easily regulated. The reaction was terminated when no more reflux could be observed at an internal temperature of 90° C. This occurred after 2 to 3 hours. The consumption of potassium bromate amounted to 100 ml. of a 0.2% aqueous solution. The polymerization was allowed to proceed to completion by maintaining this internal temperature of 90° C. for ½ hour. The reaction mixture was then allowed to cool, accompanied by stirring. Thereafter, it was filtered, washed and dried in vacuo. The reaction was practically complete.

EXAMPLE II

*Polyvinyl Alcohol by Alkaline Saponification*

80 gm. of the suspension polymerizate of polyvinyl acetate prepared in Example I were dissolved in 1500 gm. of methanol (complete solution occurred after 2 hours of stirring in boiling methanol). The resulting solution was heated for 5 to 10 hours under reflux and accompanied by stirring, while adding dropwise a solution of 1% (based on the weight of polyvinyl acetate) of sodium methylate in 100 gm. of methanol. Within this period of time, the polyvinyl alcohol precipitated out in a satisfactorily filtrable form. After filtering, the filter cake was washed with methanol until neutral and dried in vacuo at 30 to 40° C. The viscosity of an aqueous 4% solution of the polyvinyl alcohol (the polyvinyl alcohol formed a clear and colorless solution) was 195 centipoises at 20° C. The saponification number was 17.

EXAMPLE III

*Polyvinyl Alcohol by Acidic Saponification*

80 gm. of the polyvinyl acetate produced in Example I were dissolved in 1500 gm. of methanol, as described above in Example II. After adding 1% of a 40% perchloric acid solution, based on the weight of polyvinyl acetate, the mixture was refluxed for 5 to 10 hours. The temperature of the reflux condenser was adjusted in such a manner that the methyl acetate which was formed and which passed over between 54 and 56° C. was distilled off. Within this period of time, the polyvinyl alcohol precipitated out in satisfactorily filtrable form. After filtration, it was washed with methanol until neutral and then dried in vacuo at 30 to 40° C. The viscosity of a 4% aqueous solution of the polyvinyl alcohol (the polyvinyl alcohol formed a clear and colorless solution) was 257 centipoises at 20° C. The saponification number was 19.

While specific embodiments of the invention have been disclosed, it is readily apparent to one skilled in the art that the present invention is not limited to these specific embodiments and that various changes and modifications may be made without departing from the spirit of the invention and the scope of the appended claims.

What is claimed is:
1. The process of preparing high molecular weight polyvinyl alcohol having a viscosity of more than 120 centipoises in a 4% aqueous solution at 20° C. which comprises the steps of suspending vinyl acetate in water with the aid of a suspending agent, adding from $0.05 \times 10^{-3}$ to $5.0 \times 10^{-3}$ mols per mol of vinyl acetate of a water soluble bisulfite, heating the aqueous suspension to a temperature between 20° C. and 120° C., adding thereto an aqueous solution of from $0.01 \times 10^{-3}$ to $2.0 \times 10^{-3}$ mols per mol of vinyl acetate of a water soluble bromate while maintaining the reaction temperature between 20° C. and 120° C. for a time sufficient to effect substantially complete polymerization, separating the polyvinyl acetate, dissolving said polyvinyl acetate in a lower alkanol, refluxing said solution in the presence of an esterification catalyst selected from the group consisting of alkali metal lower alkanolates and strong mineral acids, and recovering said polyvinyl alcohol.

2. The process of claim 1 wherein said esterification catalyst is perchloric acid.

3. The process of claim 1 wherein said esterification catalyst is sodium methylate.

4. The process of preparing high molecular weight polyvinyl alcohol having a viscosity of more than 120 centipoises in a 4% aqueous solution at 20° C. which comprises the steps of emulsifying vinyl acetate in water with the aid of an emulsifying agent, adding from $0.05 \times 10^{-3}$ to $5.0 \times 10^{-3}$ mols per mol of vinyl acetate of an alkali metal bisulfite, heating the aqueous emulsion to a temperature between 20° C. and 120° C., adding thereto an aqueous solution of from $0.01 \times 10^{-3}$ to $2.0 \times 10^{-3}$ mols per mol of vinyl acetate of an alkali metal bromate while maintaining the reaction temperature between 20° C. and 120° C. for a time sufficient to effect substantially complete polymerization, separating the polyvinyl acetate, dissolving said polyvinyl acetate in a lower alkanol, refluxing said solution in the presence of an esterification catalyst selected from the group consisting of alkali metal lower alkanolates and strong mineral acids, and recovering said polyvinyl alcohol.

5. The process of preparing high molecular weight polyvinyl alcohol having a viscosity of more than 120 centipoises in a 4% aqueous solution at 20° C. which comprises the steps of suspending vinyl acetate in water with the aid of a colloidal suspending agent, adding from $0.05 \times 10^{-3}$ to $5.0 \times 10^{-3}$ mols per mol of vinyl acetate of an alkali metal bisulfiite, heating the aqueous suspension to a temperature between 60° C. and 90° C., adding thereto an aqueous solution containing from $0.01 \times 10^{-3}$ to $2.0 \times 10^{-3}$ mols per mol of vinyl acetate of an alkali metal bromate at such a rate as to maintain the reaction temperature between 60° C. and 90° C., maintaining the reaction temperature between 60° C. and 90° C. until the polymerization is substantially complete, separating the polyvinyl acetate, dissolving said polyvinyl acetate in methanol, refluxing said solution in the presence of an esterification catalyst selected from the group consisting of alkali metal lower alkanolates and strong mineral acids, and recovering said polyvinyl alcohol.

References Cited in the file of this patent

UNITED STATES PATENTS

| | | |
|---|---|---|
| 2,560,694 | Howard | July 17, 1951 |
| 3,010,929 | Jones | Nov. 28, 1961 |
| 3,033,843 | Inskip et al. | May 8, 1962 |
| 3,050,508 | Starck et al. | Aug. 21, 1962 |